(12) United States Patent
Christmas

(10) Patent No.: US 11,681,257 B2
(45) Date of Patent: Jun. 20, 2023

(54) PROJECTION

(71) Applicant: Dualitas Ltd, Milton Keynes (GB)

(72) Inventor: Jamieson Christmas, Milton Keynes (GB)

(73) Assignee: Envisics Ltd, Milton Keynes (GB)

( * ) Notice: Subject to any disclaimer, the term of this patent is extended or adjusted under 35 U.S.C. 154(b) by 0 days.

(21) Appl. No.: 17/209,747

(22) Filed: Mar. 23, 2021

(65) Prior Publication Data

US 2021/0302911 A1     Sep. 30, 2021

(30) Foreign Application Priority Data

Mar. 25, 2020   (GB) ..................................... 2004305

(51) Int. Cl.
*G03H 1/00* (2006.01)
*G03B 21/00* (2006.01)
(Continued)

(52) U.S. Cl.
CPC .......... *G03H 1/0005* (2013.01); *G03B 21/005* (2013.01); *G03H 2001/0224* (2013.01); *G03H 2001/2215* (2013.01); *G03H 2223/14* (2013.01)

(58) Field of Classification Search
CPC .......... G03H 1/08; G03H 1/22; G03H 1/0808; G03H 1/2202; G03H 1/2286;
(Continued)

(56) References Cited

U.S. PATENT DOCUMENTS

| | | | |
|---|---|---|---|
| 6,377,370 B1* | 4/2002 | Taketomi | G03H 1/0402 359/33 |
| 2009/0128872 A1* | 5/2009 | Christmas | G02B 27/54 359/9 |

(Continued)

FOREIGN PATENT DOCUMENTS

| EP | 3438726 | 2/2019 |
|---|---|---|
| GB | 2567409 A | 4/2019 |

(Continued)

OTHER PUBLICATIONS

United Kingdom Combined Search and Examination Report for Great Britain Application No. GB2004305.5 dated Sep. 11, 2020, 8 pages.

*Primary Examiner* — Stephone B Allen
*Assistant Examiner* — Jyotsna V Dabbi
(74) *Attorney, Agent, or Firm* — McDonnell Boehnen Hulbert & Berghoff LLP

(57) ABSTRACT

An image projector arranged to project an image onto a display plane. The image projector comprises a processing engine, a display device, an optical element and a light source. The processing engine outputs a computer-generated diffractive pattern comprising a hologram of an image for projection and a lens function corresponding to a lens having a first optical power. The display device is arranged to display the computer-generated diffractive pattern. The optical element is disposed between the display device to the display plane. The optical element has second optical power. The light source is arranged to provide off-axis illumination of the display device in order to spatially-modulated light in accordance with the hologram and lens function. The lens function of the computer-generated diffractive pattern and the optical element collectively perform a hologram trans- (Continued)

form of the hologram such that a reconstruction of the image is formed on the display plane.

23 Claims, 9 Drawing Sheets

(51) Int. Cl.
*G03H 1/02* (2006.01)
*G03H 1/22* (2006.01)

(58) Field of Classification Search
CPC .......... G03H 1/2294; G03H 1/12; G03H 1/04; G03H 2001/2218; G03H 2001/2223; G03H 2001/0224; G03H 2001/2215; G03H 2001/221; G03H 2223/14; G03H 2225/00; G03H 2225/25–34; G03H 2240/00; G03H 2240/11–13; G03B 21/00; G03B 21/14; G03B 21/005

USPC .......................................................... 359/15
See application file for complete search history.

(56) References Cited

U.S. PATENT DOCUMENTS

| | | | |
|---|---|---|---|
| 2019/0041797 A1* | 2/2019 | Christmas | ............ G03B 21/006 |
| 2019/0064738 A1 | 2/2019 | Cole et al. | |
| 2020/0117002 A1 | 4/2020 | Onda et al. | |

FOREIGN PATENT DOCUMENTS

| | | | | |
|---|---|---|---|---|
| GB | 2574823 | | 12/2019 | |
| GB | 2576553 | A | 2/2020 | |
| JP | H08190073 | | 7/1996 | |
| WO | WO-2004064370 | A2 * | 7/2004 | ............ G02B 17/06 |
| WO | 2019/243096 | A1 | 12/2019 | |

\* cited by examiner

PROJECTION

CROSS-REFERENCE TO RELATED APPLICATIONS

This application claims the benefit of priority of United Kingdom Patent Application no. 2004305.5, filed Mar. 25, 2020, which is hereby incorporated herein by reference in its entirety.

FIELD

The present disclosure relates to a projector. More specifically, the present disclosure relates to an image projector such as a holographic projector and a holographic projection system. Some embodiments relate a method of reducing the size of the image spots in a holographic replay field and some embodiments relate to a method of increasing the resolution in a holographic replay field. Some embodiments relate to a head-up display.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram, "CGH", may be calculated by a technique based on a mathematical transformation such as a Fresnel or Fourier transform. These types of holograms may be referred to as Fresnel or Fourier holograms. A Fourier hologram may be considered a Fourier domain representation of the object or a frequency domain representation of the object. A CGH may also be calculated by coherent ray tracing or a point cloud technique, for example.

A CGH may be encoded on a spatial light modulator, "SLM", arranged to modulate the amplitude and/or phase of incident light. Light modulation may be achieved using electrically-addressable liquid crystals, optically-addressable liquid crystals or micro-mirrors, for example.

The SLM may comprise a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The SLM may be reflective meaning that modulated light is output from the SLM in reflection. The SLM may equally be transmissive meaning that modulated light is output from the SLM is transmission.

A holographic projector for imaging may be provided using the described technology. Such projectors have found application in head-up displays, "HUD", vehicle headlamps and light detection and ranging, "LiDAR", for example.

There is disclosed herein an improved holographic projection system.

SUMMARY

Aspects of the present disclosure are defined in the appended independent claims.

There is disclosed herein an image projector arranged to project an image onto a display plane. The image projector comprises a processing engine, a display device, an optical element and a light source. The processing engine is arranged to output a computer-generated diffractive pattern. The computer-generated diffractive pattern comprises a hologram of an image for projection and a lens function corresponding to a lens having first optical power. The display device is arranged to display the computer-generated diffractive pattern. The optical element is disposed between the display device and the display plane on a projection axis from the display device to the display plane. In some embodiments, the optical element is arranged perpendicular to the projection axis. The optical element has second optical power. The light source is arranged to provide off-axis illumination of the display device in order to spatially-modulate light in accordance with the hologram and the lens function. The lens function of the computer-generated diffractive pattern and the optical element collectively perform a (hologram) transform of the hologram such that a reconstruction of the image is formed on the display plane. The display device is tilted with respect to the optical element by a first angle greater than zero. The display plane is tilted with respect to the optical element by a second angle greater than zero. The second angle is less than the first angle. For the avoidance of doubt, the first optical power and second optical power are both greater than zero.

In embodiments, the display device and display plane are tilted about the same plane containing the projection axis. For example, the display device and display plane may be tilted about the horizontal plane containing the projection axis. In embodiments, the display device and display plane are tilted in the same direction or dimension with respect to the optical element. In some embodiments, the optical axis of the optical element is colinear with the projection axis from the display device to the display plane. In embodiments, the relative tilt between the display device and optical element (i.e. first angle) is equal to the angle of incidence of light on the display device. In embodiments, the relative tilt between the display plane and optical element (i.e. second angle) is less than the angle of incidence of light on the display device.

In projection, it is conventional to orientate the projection screen—i.e. display plane—such that it is normal to the propagation axis of light from the display device. This conventionally forms the best image—particularly if the image is formed of image spots or pixels. However, the inventor has actually found that with holographic projection this geometry gives rise to sub-optimal holographic reconstruction because there is an adverse effect on the size of the image spots formed by the holographic process—particularly, the image spots at the edge of the holographic replay field. The inventor herein discloses that, in holographic projection using off-axis illumination of the display device and an optical element that contributes to the hologram transform (e.g. Fourier or Fresnel transform), the size of the holographic image spots in the replay field can be reduced by tilting the display plane relative to the display device by an angle less than the angle of incidence of light on the display device (but greater than zero). The smaller image spots (c.f. image pixels) are advantageous in a display device.

The difference between the first angle and second angle (i.e. the relative tilt between the display device and the display plane) may be dependent on (e.g. inversely proportional to) the ratio between the first optical power and the second optical power. The difference between the first angle and second angle may be a function of the ratio between the first optical power and the second optical power. The ratio between the first angle and second angle may be a function of (e.g. inversely proportional to) the ratio between the first optical power and the second optical power. For example, the first optical power may be equal to the second optical power and the second angle may be half the first angle.

The inventor has previously found that, with off-axis illumination of the display device and in the absence of an optical element having optical power between the display device and the display plane, the size of the image spots is minimised when the relative tilt between the display device and the display plane is zero (i.e. the display device and the display plane are substantially parallel). As disclosed herein, the inventor has found that, with off-axis illumination of the display device and in the presence of an optical element having optical power between the display device and the display plane, the size of the image spots is minimised when there is a relative tilt between the display device and the display plane. The inventor has found that when the first optical power is substantially equal to the second optical power, the size of the image spots is minimised when the second angle is half the first angle. The inventor has further found that, as the second optical power increases relative to the first optical power, the second angle may be reduced so as to minimise image spots size. It may be said that the second optical power of the optical element appears to exert a pull on the display plane so as to increase the relative tilt between the display device and the display plane or, conversely, to reduce the tilt of the display plane relative to the optical element (i.e. to reduce the second angle). Thus, the relative tilt may be a minimum (greater than zero) when the second optical power is dominated by the first optical power (i.e. the optical power of the lens function is substantially greater than the optical power of the optical element—or the software lens is "dominant") and the relative tilt may be at a maximum when the first optical power is dominated by the second optical power (i.e. the optical power of the optical element is substantially greater than the optical power of the lens function—or the hardware lens in "dominant"). For the avoidance of doubt, this finding it true when the first optical power and the second optical power are non-zero.

The display device is illuminated with collimated light. The person skilled in the art of optics will be familiar with the concept of "normal incidence". However, the present disclosure relates to so-called "off-axis illumination". Specifically, the present disclosure relates to off-axis illumination of a display device displaying a diffractive pattern including a hologram. The term "off-axis illumination" is used herein to refer to cases in which the angle of incidence of light on the display device is non-zero or greater than zero. More specifically, the azimuth angle between a ray of the incident light and the normal to the plane of the display device at the point of incidence is non-zero or greater than zero. It may therefore be said that the present disclosure relates to "non-normal incidence" of the display device.

The display plane receives spatially-modulated light from the display device. In particular, spatially modulated light follows an "output path" or "propagation path" from the spatial light modulator. The axis of the propagation path is defined herein as the "output optical axis" or "propagation axis". The propagation axis is a straight-line between the display device and display plane defining a general propagation direction of light from the display device. When the computer-generated diffractive pattern does not comprise a grating function (which may change the direction of the output light beam as well known in the art), the propagation axis of the spatially modulated light is at the same angle to the display device as the angle of incidence of the light on the display device. The angle of incidence of light on the display device is also herein referred to as the "illumination angle". As the skilled person will understand, light that is not diffracted by the display device is output at the same angle as the angle of incidence of light on the display device. Accordingly, this non-diffracted light follows the propagation axis of the propagation path of the spatially modulated light, in the absence of grating function, and forms the so called "DC spot" in the zero order replay field. The propagation distance of light from the spatial light modulator to the display plane is measured along this propagation axis.

In some embodiments, the computer-generated diffractive pattern is a Fourier hologram combined with a software lens function. In other embodiments, the computer-generated diffractive pattern is (i) a Fourier hologram combined with a software lens function or (ii) a Fresnel hologram. A physical lens (or any optical element having optical power—i.e. a lensing effect) is included in the propagation path from the display device to the display plane.

Notably, the distance from the display device (i.e. the light modulation plane) to the display plane (i.e. the plane containing the image) is determined by both the optical power of the lensing function combined with the hologram and the optical power (i.e. focal length) of the physical, optical element (e.g. lens). More specifically, the perpendicular distance or shortest straight-line distance between the display device and display plane is determined by the diffractive pattern and the optical element. It may be considered that the software lens component (or component providing a lensing effect on received light) is embedded or contained in the computer-generated diffractive pattern (as the lens/lensing function described herein), and that lens component only partially contributes to the distance from the display device to the display plane—i.e. contributes to the hologram transform.

Light modulation data representing the computer-generated diffractive pattern is provided to the display device. The light modulation data comprises an array of data values such as a 2D array of data values. The display device—e.g. spatial light modulator—may comprise a plurality of pixels and each light modulation data value may be assigned to a corresponding pixel. In other words, each pixel of the spatial light modulator may be operated at a light modulation level corresponding to a respective light modulation data value of the array of light modulation data values. The data values may be phase-delay values or amplitude-attenuation levels or both.

In the Fourier case, the necessary lensing function for the hologram transform (e.g. Fourier transform) is partially provided in software using lens data added to Fourier hologram data. The so-called propagation distance from the display device (e.g. spatial light modulator) to the display plane (e.g. light-receiving surface) is partially determined—not fully determined—by the focusing power of the software lens emulated by the lens data. The propagation distance may be equal to the focal length of the software lens plus the focal length of the optical element. The propagation distance is the so-called Fourier path length. The method may further comprise the software and hardware lens performing a frequency-space transform of the Fourier transform hologram. In this case, the distance from the display device to the display plane may be equal to the focal length of the two lenses.

In the Fresnel case, the propagation distance is partially defined by a term in the Fresnel transform used to calculate the hologram. This term contributes to the distance from the hologram plane to the display plane. That is, the distance from the display device (e.g. spatial light modulator) to the focal plane where a light-receiving surface should be positioned. It may therefore be said that the distance from the spatial light modulator to the display plane (e.g. light-receiving surface) is partially determined by to the propagation distance, z, encoded in the Fresnel transform and partially determined by the focal length of the optical element.

The angle of incidence of light from the light source on the display device (i.e. illumination angle) may be less than 60 degrees, such as less than 45 degrees or less than 30 degrees. In embodiments described by way of example only, the angle is equal to or less than 20 or 15 degrees. In these cases, a more compact system is provided. In practice, the angle may be optimised as part of a larger system design.

In some embodiments, the computer-generated diffractive pattern is a light modulation data comprising an array of phase-delay data values. In the Fourier case, phase-delay data corresponding to a lens may be readily calculated and combined with the hologram data of the hologram by wrapped addition which is not computationally demanding. Accordingly, a phase modulating scheme may be preferred.

In embodiments, the display plane comprises a light-receiving screen and the light-receiving surface may be diffuse. For example, the light-receiving surface may be a diffuser. The light-receiving surface may be moving such as rotating or oscillating. Accordingly, no keystone effect or image stretching is observed in the replay field.

The spatial light modulator may be a liquid crystal on silicon spatial light modulator and the spatial light modulator is illuminated with coherent light. The light source may be a laser such as a laser diode.

In embodiments, optimised image spots are provided as a result of the difference between the first angle and second angle being inversely proportional to the ratio between the first optical power and the second optical power (or proportional to the ratio between the second optical power and the first optical power). In one example, the first optical power is equal to the second optical power, the second angle is half the first angle.

The optical element may be substantially perpendicular to the propagation axis of spatially modulated light from the display device to the display plane. In other words, the optical axis of the optical element is generally parallel to (e.g. colinear with) the axis of the image projector. In embodiments, the image projector is a holographic projector.

There is also disclosed herein a holographic projector comprising: a spatial light modulator arranged to display a hologram (e.g. Fourier or Fresnel hologram), wherein the hologram includes an image component and a lens component having a first optical power; a light-receiving surface; a physical lens, having a second optical power, on the optical/projection axis from the spatial light modulator to the light-receiving surface; a light source arranged to provide off-axis illumination of the spatial light modulator and spatially-modulated light in accordance with the hologram, wherein the lens component of the hologram and physical lens collectively perform a hologram transform (e.g. Fourier or Fresnel transform) of the image component such that a holographic reconstruction corresponding to the hologram is formed on the light-receiving surface, wherein the physical lens is tilted with respect to the spatial light modulator by a primary angle greater than zero and the light-receiving surface is tilted with respect to the spatial light modulator by a secondary angle greater than zero, wherein the secondary angle is less than the primary angle.

In a comparative example, there is a holographic projector comprising a processing engine, spatial light modulator, light source and light-receiving surface. The processing engine outputs a computer-generated diffractive pattern defining (or incorporating) a propagation distance to an image plane. The spatial light modulator displays the computer-generated diffractive pattern. The light source illuminates the spatial light modulator at an angle of incidence greater than zero. The light-receiving surface receives spatially-modulated light from the spatial light modulator. The light-receiving surface is substantially parallel to the spatial light modulator. The light-receiving surface is separated from the spatial light modulator by the propagation distance defined by the computer-generated diffractive pattern. Broad reference is made herein to a light-receiving surface because the holographic reconstruction may be formed on any surface.

The term "tilted" or "relative tilt" is used herein to reflect that the general plane of one object is non-parallel with the general plane of another object. In simple terms, the two objects are not parallel. The person skilled in the art of optics will appreciate that optical components such as lenses, liquid crystal display panels and screens are substantially planar. The person skilled in the art will also appreciate that the optical axis of an optical element such as a lens, display device or projection plane is substantially perpendicular to the general plane of the optical element itself. Therefore, it may be said that if there is a relative tilt between a first element and second element, the optical axis of the first element is substantially non-parallel with the optical axis of the second element. In conventional optical systems, each optical element may be arranged with its plane perpendicular to the optical axis of light through the optical system such that the optical axis of each optical element is colinear with the optical axis of the system. However, in consequence of the off-axis illumination of the display device, the present disclosure relates to optical systems, in which the plane of one or more of the optical elements is tilted with respect to the conventional plane, arranged perpendicular to the optical axis of light through the optical system, such that the optical axis of each of the one or more optical elements is tilted with respect to the optical axis of the system. It may be said that the plane of one or more optical elements is arranged at an angle less than 90 degrees to the optical axis (e.g. projection axis) of the system, or the optical axis of one or more optical elements is arranged at an angle less than 90 degrees to the optical axis of the system.

The term "hologram" is used to refer to the recording which contains amplitude information or phase information, or some combination thereof, about the object. The term "holographic reconstruction" is used to refer to the optical reconstruction of the object which is formed by illuminating the hologram. The term "replay plane" is used herein to refer to the plane in space where the holographic reconstruction is fully formed. The term "replay field" is used herein to refer to the sub-area of the replay plane which can receive spatially-modulated light from the spatial light modulator. The terms "image", "replay image" and "image region" refer to areas of the replay field illuminated by light forming the holographic reconstruction. In embodiments, the "image" may comprise discrete spots which may be referred to as "image pixels".

The terms "encoding", "writing" or "addressing" are used to describe the process of providing the plurality of pixels of the SLM with a respect plurality of control values which respectively determine the modulation level of each pixel. It may be said that the pixels of the SLM are configured to "display" a light modulation distribution in response to receiving the plurality of control values. Thus, the SLM may be said to "display" a hologram.

It has been found that a holographic reconstruction of acceptable quality can be formed from a "hologram" containing only phase information related to the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will change the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The present disclosure refers to "lens data corresponding to a lens having a focal length". This wording is used to reflect that the lens data emulates or provides the functionality (i.e. focusing power) of a lens such as a physical lens in the optical path. The lens data is also referred to as a software lens. In accordance with this disclosure, the software lens is used in combination with an optical element having optical power such as a physical lens.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION OF EMBODIMENTS

Figure 1:
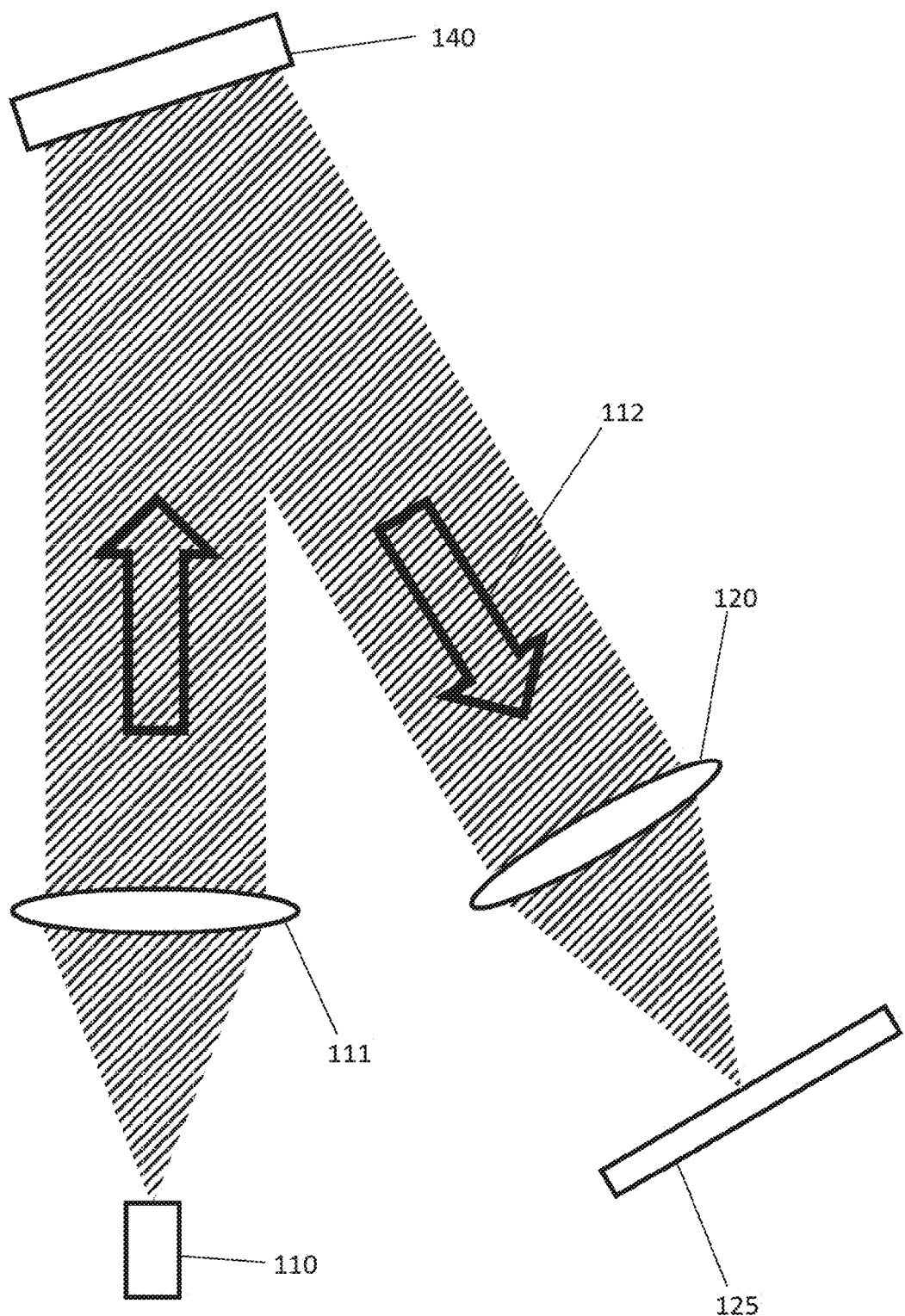
FIG. 1 is a schematic showing a reflective SLM producing a holographic reconstruction on a screen.

The present invention is not restricted to the embodiments described in the following but extends to the full scope of the appended claims. That is, the present invention may be embodied in different forms and should not be construed as limited to the described embodiments, which are set out for the purpose of illustration.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not be limited by these terms. These terms are only used to distinguish one element from another. For example, a first element could be termed a second element, and, similarly, a second element could be termed a first element, without departing from the scope of the appended claims.

In the following description, terms that relate to orientation, such as "horizontal" and "vertical", are used to describe the orientation of features of an optical arrangement shown in the drawings, for each of understanding. The skilled person will understand that, in a practical arrangement, the orientation of such features may vary, dependent upon application requirements.

Features of different embodiments may be partially or overall coupled to or combined with each other, and may be variously inter-operated with each other. Some embodiments may be carried out independently from each other, or may be carried out together in co-dependent relationship.

Optical Configuration

FIG. 1 shows an example in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wave-front is off-normal (e.g. two or three degrees away from being truly orthogonal to the plane of the transparent layer). However, in other embodiments, the generally planar wave-front is provided at normal incidence and a beam splitter arrangement is used to separate the input and output optical paths. In the example shown in FIG. 1, the arrangement is such that light from the light source is reflected off a mirrored rear surface of the SLM and interacts with a light-modulating layer to form an exit wave-front 112. The exit wave-front 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

The position of the holographic reconstruction in space is determined by the dioptric (focusing) power of the Fourier transform lens. In FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform. In accordance with this disclosure, the Fourier transform is performed partially by the physical lens shown in FIG. 1 and partially by a so-called software lens combined with or embedded in the hologram.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(X, y)$ are related by a single Fourier transform. With the given intensity cross-sections, an approximation to the phase distribution in the planes A and B, $\psi_A(x, y)$ and $\psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\psi[u, v]$ of the Fourier transform of the data set which gives rise to a known amplitude information $T[x, y]$, wherein the amplitude information $T[x, y]$ is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\psi[u, v]$ is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
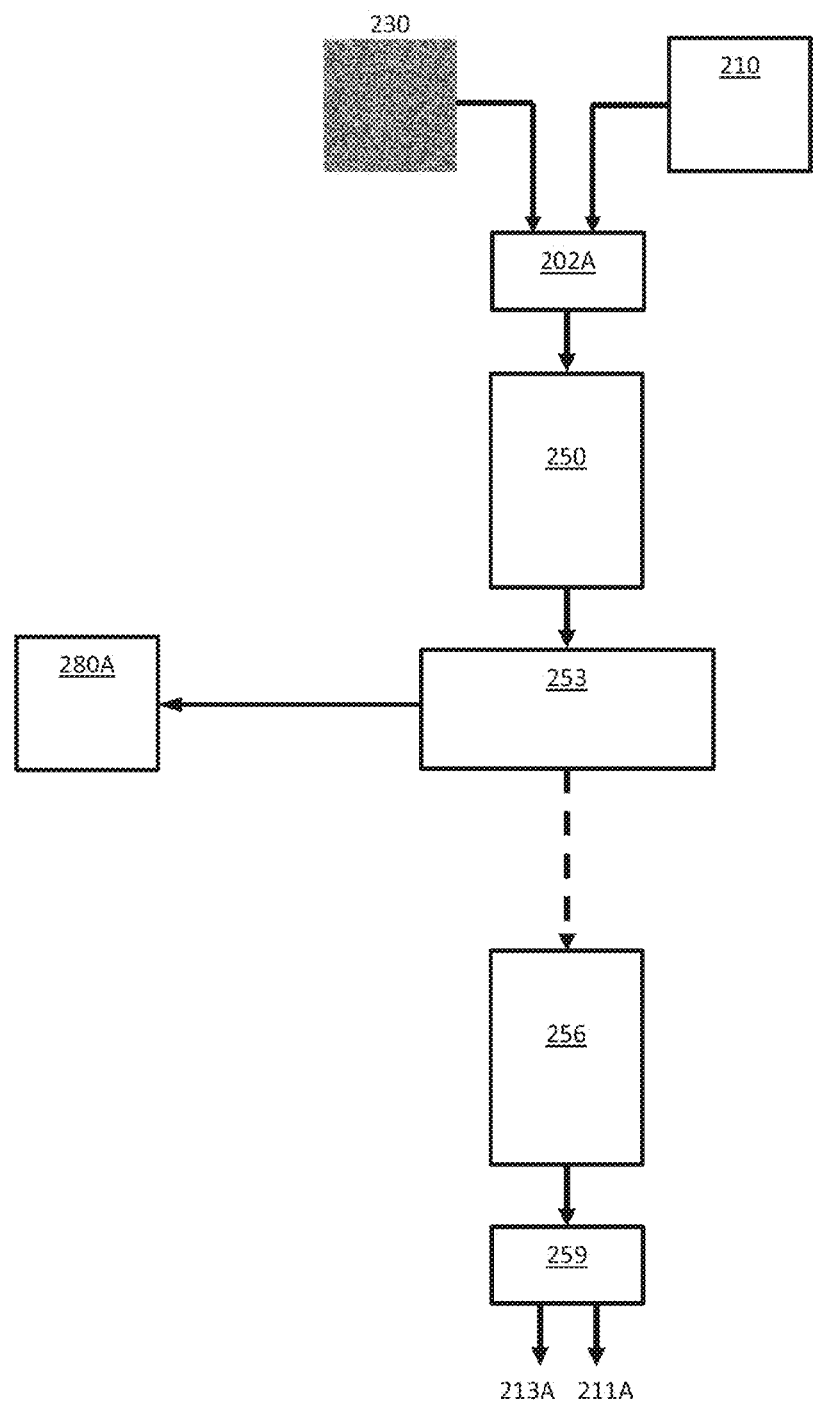
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
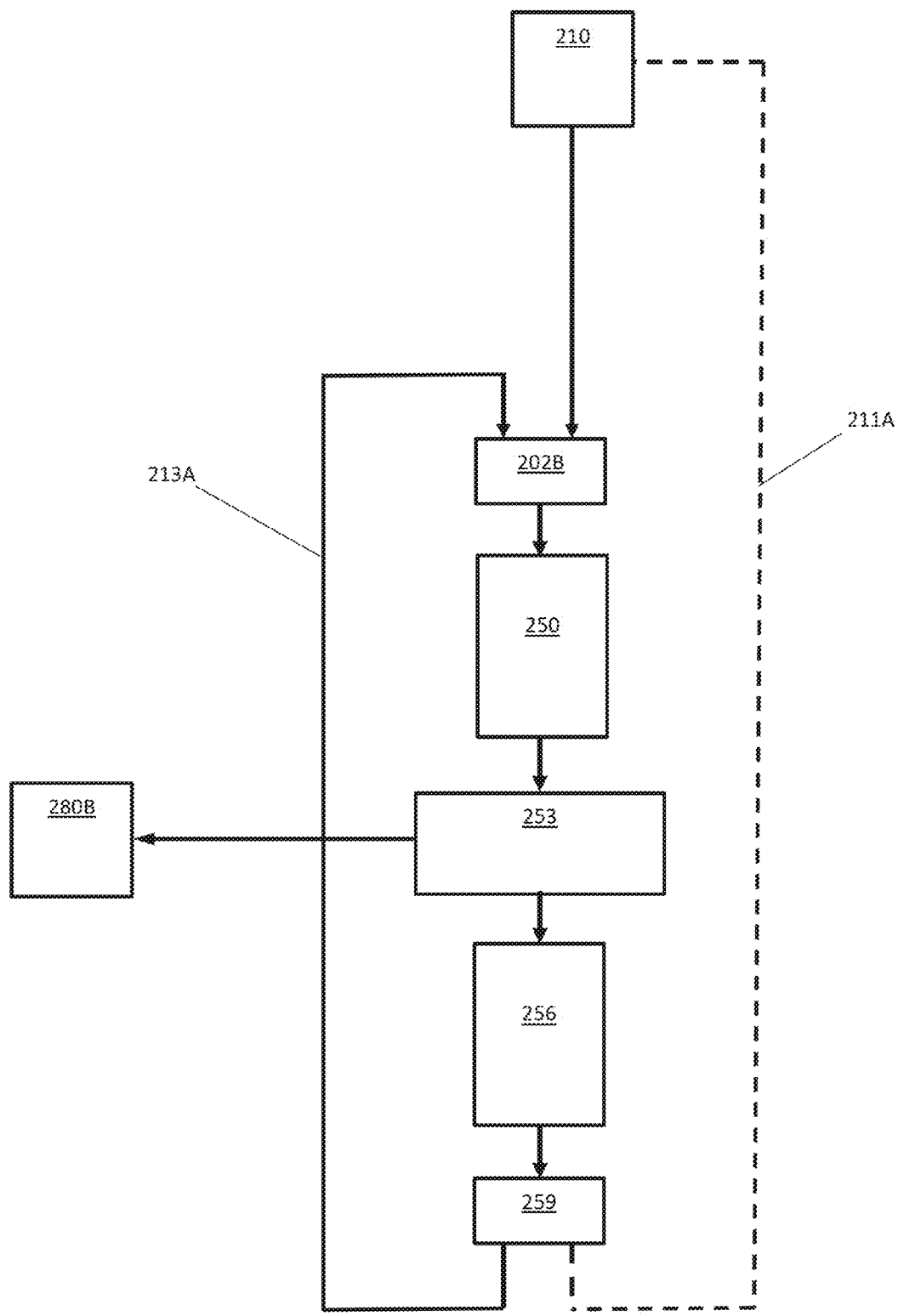
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
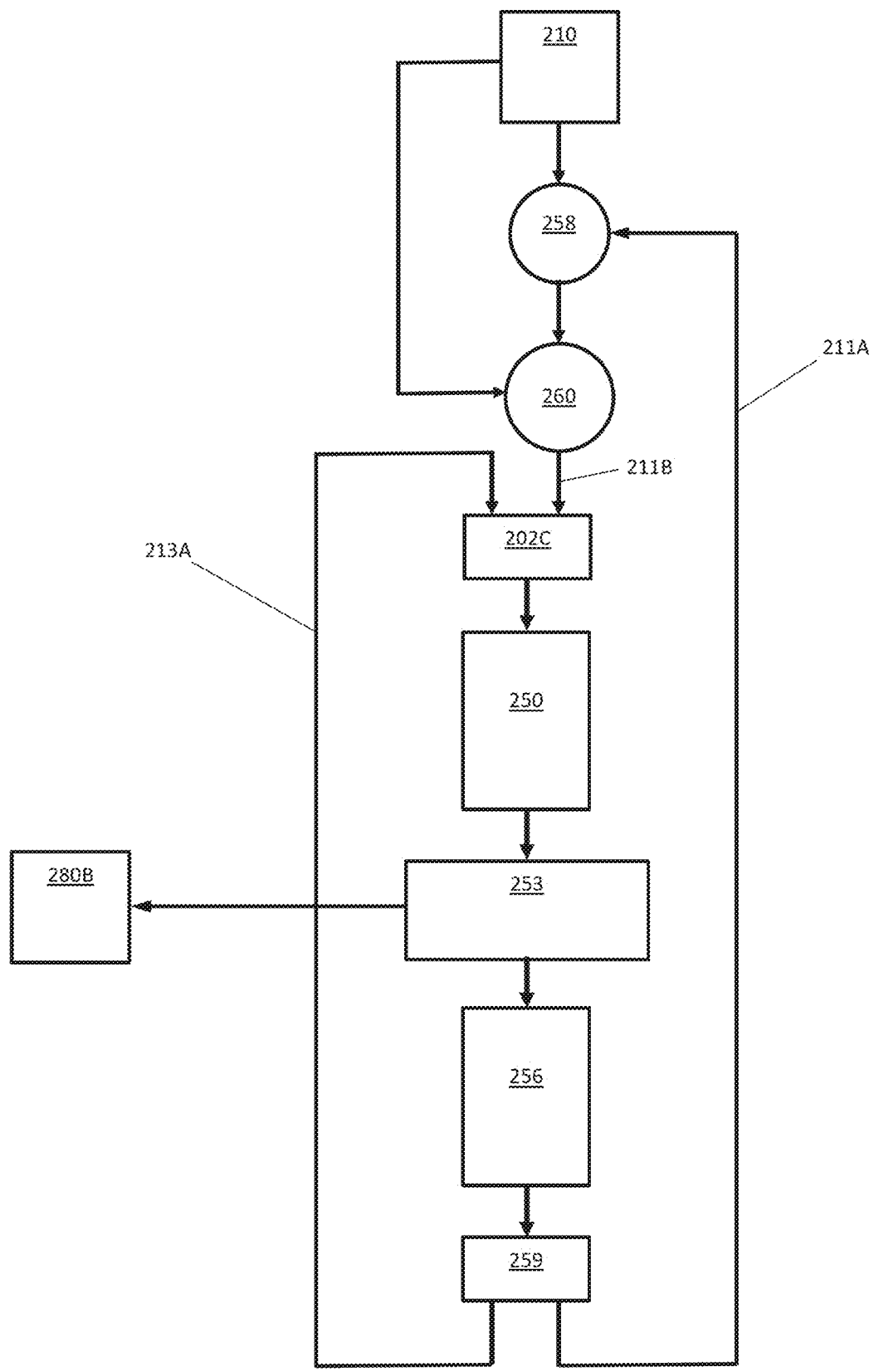
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x,y]=F'\{\exp(i\psi_n[u,v])\}$$

$$\psi_n[u,v]=\angle F\{\eta \cdot \exp(i\angle R_n[x,y])\}$$

$$\eta=T[x,y]-\alpha(|R_n[x,y]|-T[x,y])$$

where:
F' is the inverse Fourier transform;
F is the forward Fourier transform;
R[x, y] is the complex data set output by the third processing block 256;
T[x, y] is the input or target image;
∠ is the phase component;
ψ is the phase-only hologram 280B;
η is the new distribution of magnitude values 211B; and
α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram ψ(u, v) comprises a phase distribution in the frequency or Fourier domain.

In accordance with the present disclosure, the diffractive pattern comprising the hologram for encoding on a spatial light modulator includes data representative of a lens (i.e. a lens component) as well as data representing the object (i.e. a hologram component). The physical Fourier transform lens 120 shown in FIG. 1 is not present. It is known in the field of computer-generated hologram how to calculate holographic data representative of a lens. The holographic data representative of a lens may be referred to as a software lens. For example, a phase-only holographic lens may be formed by calculating the phase delay caused by each point of the lens owing to its refractive index and spatially-variant optical path length. For example, the optical path length at the centre of a convex lens is greater than the optical path length at the edges of the lens. An amplitude-only holographic lens may be formed by a Fresnel zone plate. It is also known in the art of computer-generated hologram how to combine holographic data representative of a lens with holographic data representative of the object so that a Fourier transform can be performed without the need for a physical Fourier lens. In some embodiments, lensing data is combined with the holographic data by simple addition such as simple vector addition. In further embodiments, the diffractive pattern comprising the hologram for encoding on the spatial light modulator may include grating data—that is, data arranged to perform the function of a grating such as beam steering. Again, it is known in the field of computer-generated holography how to calculate such holographic data and combine it with holographic data representative of the object. For example, a phase-only holographic grating may be formed by modelling the phase delay caused by each point on the surface of a blazed grating. An amplitude-only holographic grating may be simply superimposed on an amplitude-only hologram representative of an object to provide angular steering of an amplitude-only hologram. For simplicity, examples described herein concern a spatial light modulator encoded with a diffractive pattern that does not include a grating function, such that that propagation axis of the output spatially modulated light corresponds to the axis of output light that is not diffracted by the spatial light modulator.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography.

Light Modulation

A spatial light modulator may be used to display the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimeters in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
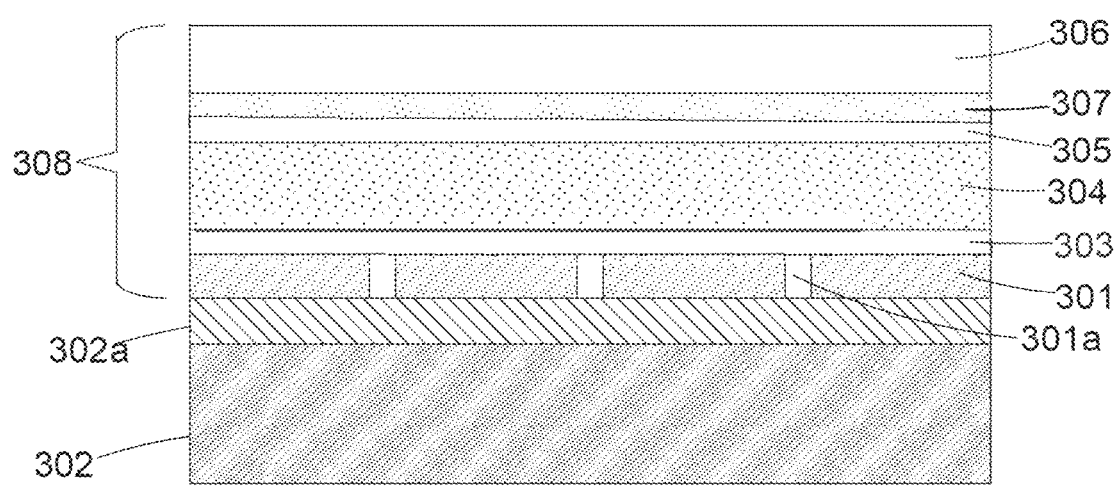
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301*a*. By control of the voltage applied to each electrode 301 with respect to the transparent electrode 307, the properties of the liquid crystal material may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Relative Tilt of Spatial Light Modulator and Light-Receiving Surface

Figure 4A:
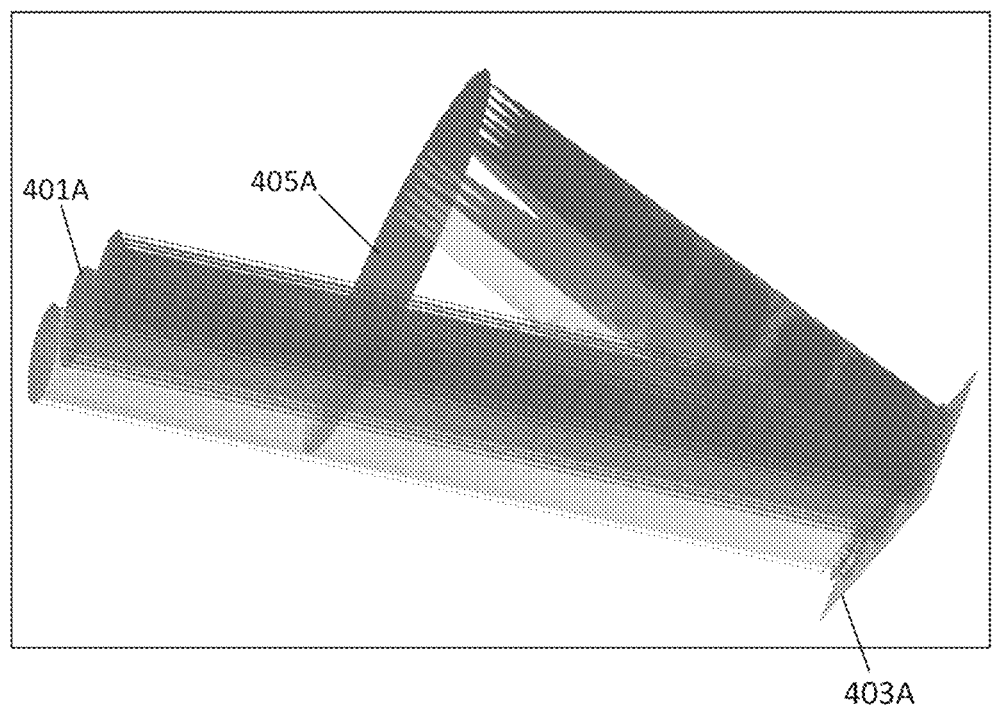
FIG. 4A shows the basic optical set-up in accordance with the present disclosure.

FIG. 4A shows three light channels. Each light channel comprises a light source, spatial light modulator and light-receiving surface. Each light channel provides a holographic reconstruction in one colour. Accordingly, a composite colour holographic reconstruction may be provided by using a plurality of single colour channels such as red, green and blue channels and overlapping the single colour replay fields at the replay plane. The hologram of each channel is tailored to the colour content of that channel. FIG. 4A shows three light channels by way of example only. The three channels are substantially parallel and may share a common spatial light modulator—for example, a subset of pixels of the common spatial light modulator may be allocated to each respective colour channel—or each channel may have its own spatial light modulator. The three corresponding replay fields may be coincident at the replay plane. The teachings of the present disclosure are equally applicable to a holographic projector comprising one light channel or any number of light channels. For simplicity, reference is made in the following to the components of just one of the light channels.

FIG. 4A shows a light source 401A illuminating a corresponding liquid crystal on silicon spatial light modulator 403A. The spatial light modulator 403A displays a diffractive/light modulation pattern comprising a computer-generated hologram. The light is incident on the spatial light modulator 403A at an angle greater than zero to the normal of the spatial light modulator 403A. The spatial light modulator 403A is planar and reflective so the spatially-modulated light is output at the same angle to the normal of the spatial light modulator 403A. The spatially modulated light is received by the light-receiving surface 405A.

Figure 4B:
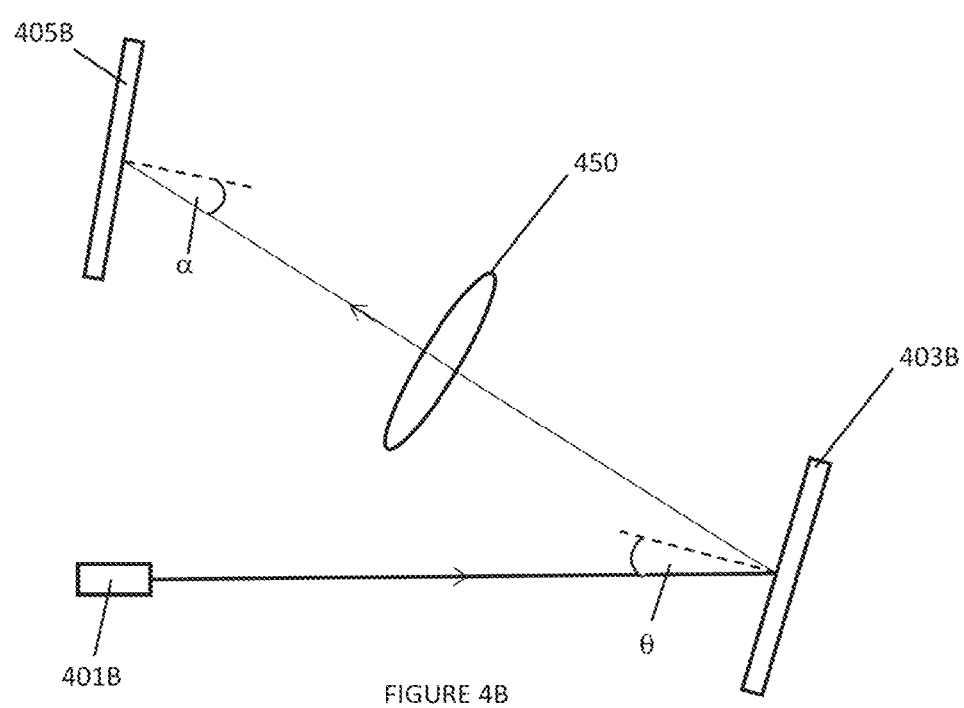
FIG. 4B is a schematic corresponding to FIG. 4A.

FIG. 4B shows a schematic of the image projector in accordance with this disclosure. In particular, FIG. 4B is a schematic ray diagram showing the direction of light along the propagation axis of the image projector. A light source 401B illuminates a spatial light modulator 403B at an angle of θ to the normal of the spatial light modulator 403B. The spatial light modulator 403A displays a diffractive/light modulation pattern comprising a computer-generated hologram. In the illustrated arrangement, the spatial light modulator 403B is reflective and the diffractive/light modulation pattern does not comprise a grating function. Thus, spatially modulated light is reflected by the spatial light modulator 403B along a propagation path having an axis at the same angle θ to the normal thereof as the illumination angle. It will be appreciated that the angle of the propagation axis is the same in the case of a transmissive spatial light modulator. A light-receiving surface 405B receives the spatially-modulated light from the spatial light modulator 403B at an angle of α to the normal of the light-receiving surface 405B. Notably, a lens 450 is disposed on the light propagation path between the spatial light modulator 403B and light-receiving surface 405B. In some embodiments, the lens 450 is substantially perpendicular to the propagation axis, as illustrated in FIG. 4B. The optical axis of the lens may be substantially colinear with the propagation axis. In comparative examples without lens 450 (e.g. as shown in FIG. 4A), the spatial light modulator 403B and light-receiving surface 405B are parallel—that is, when the diffractive/light modulation pattern displayed by the spatial light modulator 403B does not comprise a grating function, θ is equal to α. In some embodiments, θ is 20 degrees but θ may have any non-zero value.

Each pixel of the spatial light modulator 403A/403B displays a respective light modulation level of light modulation data collectively forming the diffractive/light modulation pattern. The light modulation data comprises hologram data corresponding to an image for projection (i.e. a hologram component). The light modulation data also comprises lens data corresponding to a lens having an optical power (i.e. a lens component). The lens has a focal length. The holographic reconstruction is formed at the plane of the light-receiving surface 405A/405B owing to the focusing power of the lens data and lens 450. As explained above, the lens combined with the hologram may be termed a "software lens" and is a mathematical function representative of a physical lens. The software lens provides the same functionality—namely, focusing power—as a physical optical lens of the same dioptric power. The software lens may be an array of phase-delay values corresponding to the shape of the corresponding optical component. Lens 450 is referred to herein as a "hardware lens" to distinguish from the software lens. A holographic reconstruction of the image is formed on the light-receiving surface 405A/405B. The software and hardware lens collectively perform a mathematical transform—such as a Fourier transform—of the hologram. It will be understood that a Fourier transform is a frequency-space transform. In embodiments using a Fourier transform hologram, it may be said that the hologram is a frequency domain representation of the image for projection, the holographic projection is a spatial domain representation of the image and the lenses performs a frequency-space transform of the hologram.

Again, the present disclosure relates to a specific case in which θ is non-zero (in other words, greater than zero) and the inventors have observed that, in this specific case, the size of the image spots in the holographic reconstruction of a hologram displayed on the spatial light modulator can be reduced by tiling the light-receiving surface relative to the spatial light modulator by an angle less than the angle of incidence of illumination on the spatial light modulator. That is, the relative tilt or relative angle between the light-receiving surface and spatial light modulator is non zero and less than θ. In other words, in contrast to comparative examples, the difference between θ and α is non zero such that the light receiving surface and the spatial light modulator are not parallel and thus have a relative tilt. Ray tracing software has been used to verify this finding.

Figure 5:
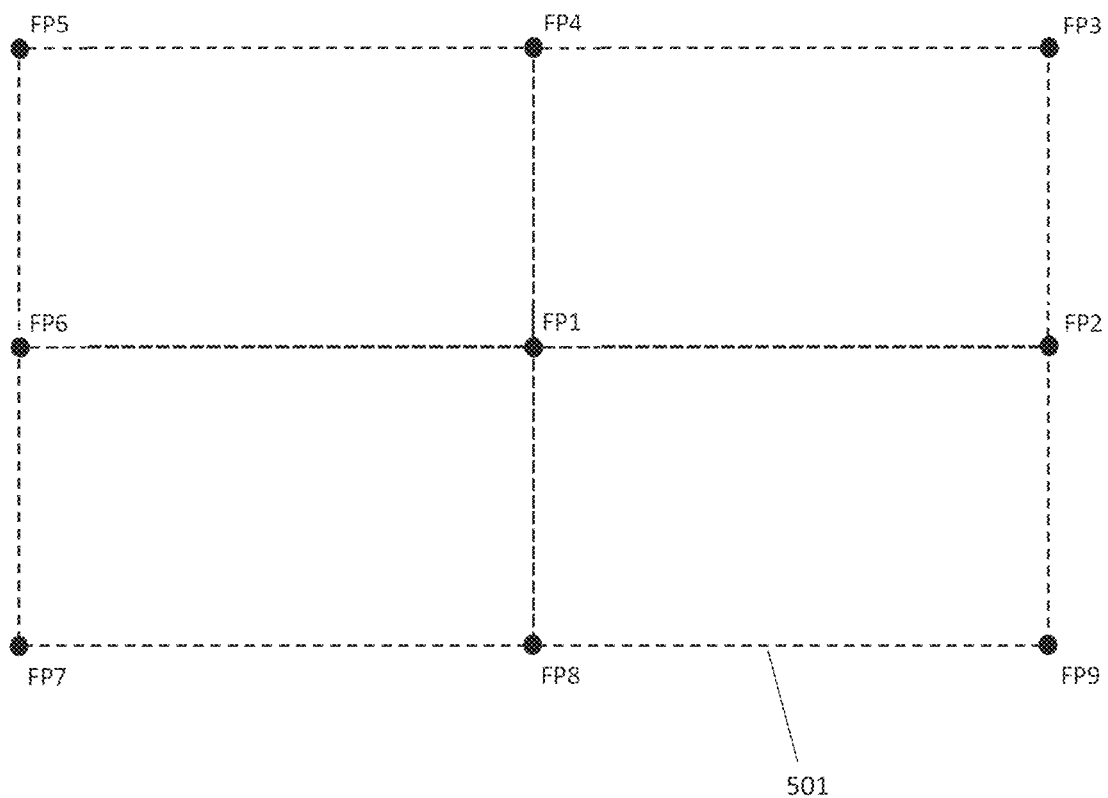
FIG. 5 is a schematic of a replay field comprising a plurality of field points.

FIG. 5 is a schematic of a holographic replay field 501 and is provided for the purpose of better understanding FIG. 6. The replay field 501 in FIG. 5 shows nine so-called field points, labelled FP1 to FP9, which are points in the replay field. Ray tracing has been used to determine the size and shape of the image spot at each of field points FP1 to FP9.

FIG. 6 shows nine example image spots corresponding to the nine field points, FP1 to FP9, of FIG. 5. The image spots corresponding to the field points are shown in ascending numerical order from left to right. That is, the image spot at FP1 is shown to the extreme left and the image spot at FP9 is shown to the extreme right.

Figure 6A:
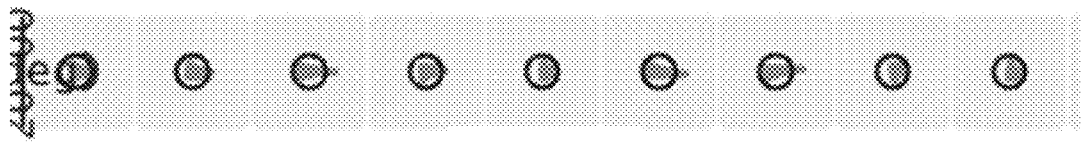
FIGS. 6A, 6B and 6C show example image spots at the replay field.
Figure 6B:
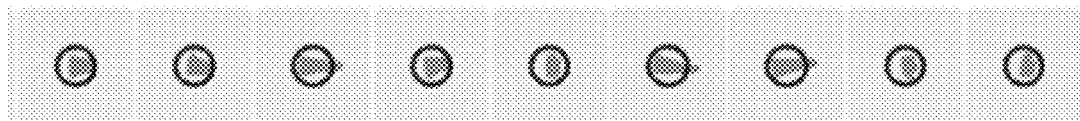
Figure 6C:
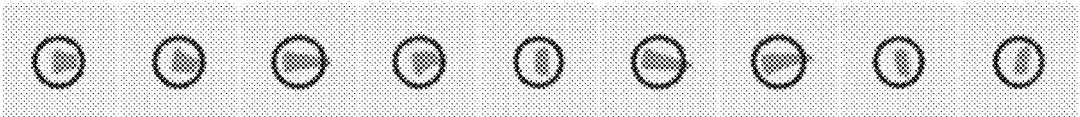

FIG. 6 shows three sets of example image spots in three respective rows obtained by ray-tracing. The top set of image spots (FIG. 6A) are formed using blue light having a wavelength of 450 nm, the middle set of image spots (FIG. 6B) are formed using green light having a wavelength of 520 nm and the bottom set of image spots (FIG. 6C) are formed using red light having a wavelength of 650 nm. The solid circle or dot shown for each image spot is the corresponding diffraction limit.

For the avoidance of any doubt, all image spots in a holographic replay field are formed at the same time from the same computer-generated diffractive pattern. For example, the nine image spots at the nine field points FP1 to FP9 are formed at the same time. This is in contrast to beam scanning systems in which each image is formed bit by bit.

It was found by ray-tracing and the analysis of image spots like those shown in FIG. 6 by way of example that, for off-axis illumination, smaller image spots are formed if the spatial light modulator and light-receiving surface are tilted relative to each other by a non-zero angle less than the angle of incidence θ of illumination on the display device. This finding is true when both a hardware lens and software lens are used for the hologram transform in an off-axis illumination scheme. The optimal configuration when only a software lens is used has been disclosed in WO2019/243096 which is incorporated herein by reference. A more detailed discussion of this finding is set out below.

In some embodiments, the relative angle between the light-receiving surface and spatial light modulator is determined by the relative values of the optical power of the hardware lens and the optical power of the software lens. In particular, the relative angle may be proportional to the ratio of the optical power of the hardware lens to the optical power of the software lens or, conversely, inversely proportional to the ratio of the optical power of the software lens to the optical power of the hardware lens. That is, if the optical power of the software lens remains constant, when the optical power of the hardware lens increases, the relative angle between the light-receiving surface and the spatial light modulator increases and when the optical power of the hardware lens decreases, the relative angle between the light-receiving surface and the spatial light modulator decreases. In a comparative example, the optical power of the hardware lens is zero and the relative tilt should therefore be zero. In another comparative example, the optical power of the software lens is zero and the relative tilt should be substantially equal to the angle of incidence on the spatial light modulator such that the light-receiving surface is substantially perpendicular to the propagation axis. However, in embodiments, the optical power of the software lens is non-zero and the optical power of the hardware lens is non-zero. In some embodiments, the relative angle is equal to half the angle of incidence multiplied by the ratio of the optical power of the software lens and hardware lens. In embodiments, the relative tilt/angle is a difference in the tilt/angle of the respective planes of the light receiving surface and spatial light modulator in relation to a plane containing, or the direction of, the projection axis of the projector.

Effect of Physical/Projection Lens on Relative Tilt

Without being bound to any particular theory, results using ray tracing software show that the optical power of the physical lens disposed on the light propagation path between the spatial light modulator and light-receiving surface relative to the optical power of the lens function provided by the computer-generated diffraction pattern has an influence on the optimal tilt of the light receiving surface to optimise the size of image spots. In particular, the inventors have found that the optimal tilt of the light receiving surface (i.e. to achieve image spots of optimum size) is pulled away from a maximum tilt θ—parallel to the spatial light modulator (SLM)—as the optical power of the physical lens increases.

Figure 7A:
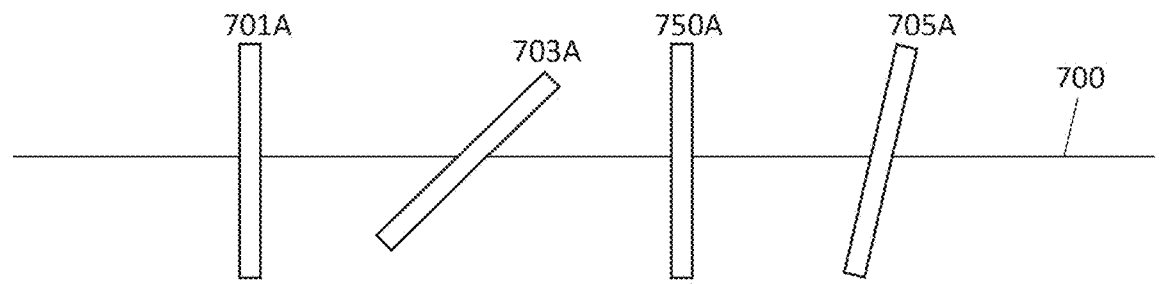
FIGS. 7A, 7B and 7C schematically show examples of the tilt of optical components, arranged along the optical axis of the system, to achieve optimised image spots for different relative optical powers of software and hardware lenses.
Figure 7B:
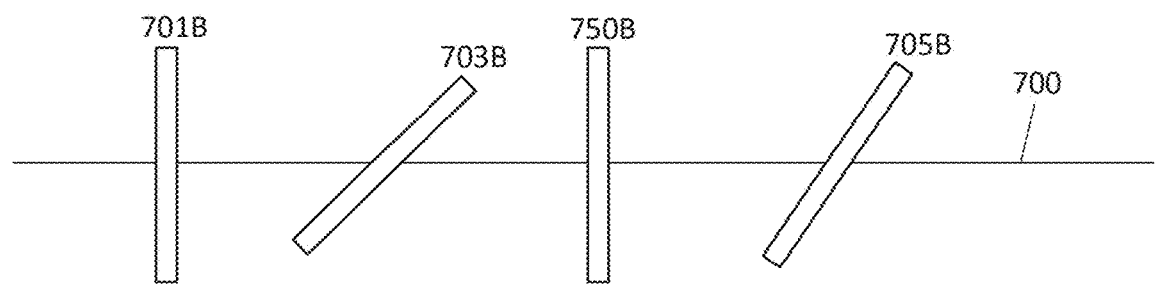
Figure 7C:
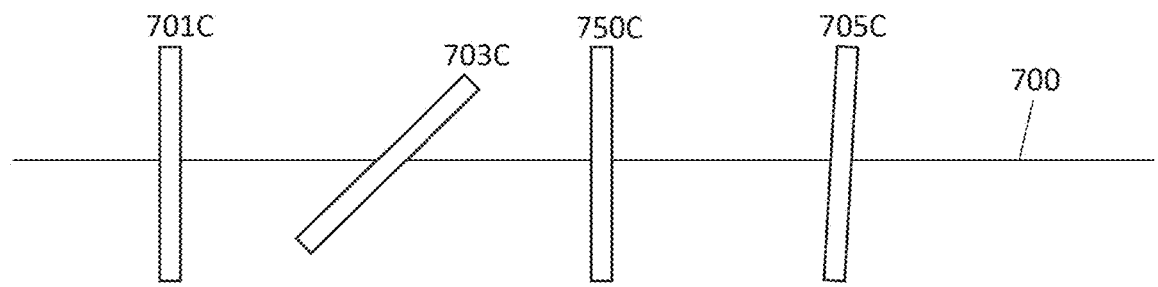

FIGS. 7A-C schematically illustrate examples of the effect of the optical power of the physical lens on the optimal tilt of the light receiving surface (e.g. diffuser or screen) observed by the inventors. In each example, the angle or tilt of each optical component of the optical system is illustrated relative to the optical axis 700, which is "unfolded" from the arrangement of FIG. 4B for ease of illustration. In each example, the optical axis 700 of the system is illustrated by a horizontal line between the light source 701A-C and the light receiving surface 705A-C. The light source 701A-C and the physical lens 750A-C are arranged colinear with the optical axis, such that the respective planes thereof are perpendicular to the optical axis. The plane of the SLM 703A-C is arranged at an angle θ to the optical axis 700, corresponding to the illumination angle as described herein. The illumination angle θ is the same in each of the examples of FIGS. 7A-C. The plane of the light receiving surface 705A-C is arranged at an angle α to the optical axis 700, corresponding to the optimal tilt to minimise the size of the image spots formed thereon as described herein. The tilt/angle of the plane of light receiving surface 705A-C and the tilt/angle of the plane of SLM 703A-C are about the same plane containing the optical axis 700. In the illustrated examples, this plane (about which the optical components are tilted) is the horizontal plane that laterally/horizontally bisects each optical component (i.e. extending into the plane of the paper in FIGS. 7A-C). The tilt of the plane of light receiving surface 705A-C is in the same direction as the tilt of the plane of SLM 703A-C. Thus, the angles α and θ have the same sign. In particular, SLM 703A-C and light receiving surface 705A-C are illustrated as being tilted in a clockwise direction relative to the horizontal optical axis 700. The optimal tilt or angle α of the light receiving surface 705A-C is different in each of the examples of FIGS. 7A-C due to a difference in optical power of the physical lens 750A-C relative to the software lens of the diffractive pattern displayed on the SLM 703A-C. In all the examples, the optical power of the software lens and the optical power of the hardware lens are non-zero.

FIG. 7A shows a first example, when the optical power of the software lens of the diffractive pattern displayed on the SLM 703A is comparable to the optical power of the physical lens 750A. In this context, the term "comparable" means substantially the same or of the same order of magnitude. In this example, the optimal angle α of the plane of the light receiving surface 705A is between the angle θ of the plane of the SLM 703 (i.e. the maximum tilt angle α) and the perpendicular/plane of physical lens 750A (i.e. zero tilt angle). It is found that, when the ratio of the optical powers (software optical power to hardware optical power) is 1:1 or 1, the angle α of the light receiving surface 705A is half the illumination angle θ (i.e. α=θ/2) and so the difference between the angle θ and α—the relative angle of the planes of the SLM 703A and light receiving surface 705A—is also half the illumination angle θ (i.e. θ−α=θ/2).

FIG. 7B shows a second example, when the optical power of the software lens of the diffractive pattern displayed on the SLM 703B is substantially greater than the optical power of the physical lens 750B, such that the software lens is "dominant". For example, in this context, the term "substantially greater" may mean of an order of magnitude greater. For instance, the ratio of optical powers (software optical power to hardware optical power) may be 10:1 or 10. In this example, the optimal angle α of the plane of the light receiving surface 705B is only slightly less than the angle θ of the plane of the SLM 703B, such that the relative tilt is small (i.e. tending towards parallel SLM and diffuser/screen). This is because the relative tilt (i.e. θ−α) is inversely proportional to the ratio of optical powers (software optical power to hardware optical power), so that, as the software lens becomes more dominant, the relative tilt decreases.

FIG. 7C shows a third example, when the optical power of the physical lens 750C is substantially greater than the optical power of the software lens of the diffractive pattern displayed on SLM 703C, such that the hardware lens is "dominant". For example, once again, the term "substantially greater" may mean of an order of magnitude greater. For instance, the ratio of optical powers (software optical power to hardware optical power) may be 1:10 or 0.1. In this example, the optimal angle α of the plane of the light receiving surface 705C is only slightly less than the perpendicular/the plane of the physical lens 750A, such that the relative tilt is large (i.e. tending towards—but less than −θ). This is because the relative tilt (i.e. θ−α) is inversely proportional to the ratio of optical powers (software optical power to hardware optical power), so that, as the hardware lens becomes more dominant, the relative tilt increases.

Example

The results set out in Tables 2 to 7 are achieved in the cases shown in Table 1. The spatial light modulator displays a diffractive pattern comprising a hologram and a software lens, without a grating function. The optical axis of the physical/projection lens is colinear with the projection axis between the spatial light modulator and the light-receiving surface. Thus, the plane of the physical lens is perpendicular to the projection axis. Accordingly, the plane of the spatial light modulator is tilted relative to the plane of the projection lens by θ and the plane of the light-receiving surface is tilted relative to the plane of the projection lens by α. The angles θ and α shown in Table 1 are angles in degrees to the normal of the plane of the spatial light modulator and light-receiving surface, respectively. The relative angle is the difference (in degrees) of the angle of the plane of the spatial light modulator relative to the angle of the plane of the light-receiving surface and amounts to the difference between θ and α (i.e. θ−α). In the example, the light-receiving surface is a diffuser.

TABLE 1

| Table | SLM plane angle θ | Diffuser plane angle α | Relative Angle |
|---|---|---|---|
| 2 | −15 | −1.57 | 13.43 |
| 3 | −15 | 0 | 15 |
| 4 | −15 | −5 | 10 |
| 5 | −15 | −15 | 0 |

TABLE 1-continued

| Table | SLM plane angle θ | Diffuser plane angle α | Relative Angle |
|---|---|---|---|
| 6 | −15 | 5 | −20 |
| 7 | −15 | 15 | −30 |

The following results were obtained using a physical lens with optical power of more than one order of magnitude greater than the optical power of the software lens and red light having a wavelength 650 nm. Thus, in this example, the physical lens is dominant (i.e. the optical power of the physical lens is substantially greater than the optical power of the software lens), as in the third example described above in relation to FIG. 7C. Thus, the relative tilt between the SLM and diffuser planes to achieve optimised image spots should be relatively large or, put another way, the angle of the diffuser plane α should be relatively small.

Note that the image spots formed at field points FP3, FP5, FP7 and FP9 (see FIG. 5) are formed at the edge of the holographic replay field, and are most subject to the adverse increase in size, as described above. The results for these field points are therefore provided at the end of each of Tables 2 to 7.

TABLE 2

| Diffuser plane angle α | Field Point | Spot Size (in μm) |
|---|---|---|
| −1.57 | FP1 | 62.5 |
| −1.57 | FP4 | 39.5 |
| −1.57 | FP6 | 26 |
| −1.57 | FP8 | 39.5 |
| −1.57 | FP2 | 25.5 |
| −1.57 | FP5 | 80.1 |
| −1.57 | FP7 | 80.1 |
| −1.57 | FP9 | 78.9 |
| −1.57 | FP3 | 78.9 |

TABLE 3

| Diffuser plane angle α | Field Point | Spot Size (in μm) |
|---|---|---|
| 0 | FP1 | 62.5 |
| 0 | FP4 | 39.3 |
| 0 | FP6 | 34.9 |
| 0 | FP8 | 39.3 |
| 0 | FP2 | 29.2 |
| 0 | FP5 | 70.6 |
| 0 | FP7 | 70.6 |
| 0 | FP9 | 88.4 |
| 0 | FP3 | 88.4 |

TABLE 4

| Diffuser plane angle α | Field Point | Spot Size (in μm) |
|---|---|---|
| −5 | FP1 | 63.1 |
| −5 | FP4 | 40.1 |
| −5 | FP6 | 40.7 |
| −5 | FP8 | 40.3 |
| −5 | FP2 | 45.4 |
| −5 | FP5 | 101.1 |
| −5 | FP7 | 101.1 |

TABLE 4-continued

| Diffuser plane angle α | Field Point | Spot Size (in μm) |
|---|---|---|
| −5 | FP9 | 58.3 |
| −5 | FP3 | 58.3 |

TABLE 5

| Diffuser plane angle α | Field Point | Spot Size (in μm) |
|---|---|---|
| −15 | FP1 | 67.3 |
| −15 | FP4 | 44.4 |
| −15 | FP6 | 105.3 |
| −15 | FP8 | 44.43 |
| −15 | FP2 | 111.4 |
| −15 | FP5 | 166.8 |
| −15 | FP7 | 166.8 |
| −15 | FP9 | 97 |
| −15 | FP3 | 97 |

TABLE 6

| Diffuser plane angle α | Field Point | Spot Size (in μm) |
|---|---|---|
| 5 | FP1 | 63.1 |
| 5 | FP4 | 39.4 |
| 5 | FP6 | 65.3 |
| 5 | FP8 | 39.4 |
| 5 | FP2 | 58.4 |
| 5 | FP5 | 49.8 |
| 5 | FP7 | 49.8 |
| 5 | FP9 | 119.8 |
| 5 | FP3 | 119.8 |

TABLE 7

| Diffuser plane angle α | Field Point | Spot Size (in μm) |
|---|---|---|
| 15 | FP1 | 66.5 |
| 15 | FP4 | 41.5 |
| 15 | FP6 | 132 |
| 15 | FP8 | 41.5 |
| 15 | FP2 | 123.4 |
| 15 | FP5 | 114.1 |
| 15 | FP7 | 114.1 |
| 15 | FP9 | 189.5 |
| 15 | FP3 | 189.5 |

The results in Tables 2 to 7 show that, for off-axis illumination, smaller image spots are formed if the spatial light modulator and light-receiving surface are non-parallel and tilted with respect to each other by an angle less than the illumination angle θ (i.e. the relative angle is greater than zero but less than θ). In the example, ignoring tilt direction or sign, for θ=15 degrees, the optimal angle of the diffuser plane α=1.57 degrees. This minimises the size of image spots formed at all field points FP1 to FP7 as shown in Table 2. As described herein, smaller image spots are preferable because they provide higher resolution in the holographic replay field. The worst results, leading to the largest image spots, is when the diffuser plane is parallel to the SLM, i.e. α=−15 degrees as shown in Table 5. Large image spots also arise with increasing positive tilt of the diffuser plane (i.e. tilt of the diffuser in the opposite direction to the SLM) as shown in Tables 6 and 7.

It is noted that the above example represents one extreme of the ratio of the optical power of the software lens to the optical power of the hardware lens. In particular, in the above example, the optical power of the hardware lens is dominant (i.e. substantially greater than the optical power of the software lens) and the optimal tilt of the diffuser plane α is a minimum but is less than the angle of the tilt θ of the display device. Thus, the relative tilt of the SLM plane and diffuser plane is a maximum but is less than the angle of the tilt θ of the display device (i.e. relative tilt is less than SLM tilt of 15 degrees). This is consistent with the third example shown in FIG. 7C. The other extreme is similar to the examples of WO2019/243096, in which there is no physical lens (i.e. the optical power of the hardware lens is zero). In this case, when the optical power of the hardware lens is greater than zero but the optical power of the software lens is dominant, the optimal tilt of the diffuser plane α is a maximum but is less than the angle of the tilt θ of the display device. Thus, the relative tilt of the SLM plane and diffuser plane is a minimum but greater than zero (i.e. the SLM and diffuser planes are almost parallel). This is consistent with the second example shown in FIG. 7B. It has been found that when the optical power of the physical lens (i.e. hardware lens) and the software lens is the same, the relative tilt of the diffuser to achieve optimum image spot size is in between these extremes. For example, if the LCOS is tilted at 15 degrees (i.e. θ=15 degrees), the optimal tilt of the diffuser plane is at the angle α=7.5 degrees, meaning the relative tilt is also 7.5 degrees.

Additional Features

Embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

In some embodiments, the light source is a laser such as a laser diode. In some embodiments, the light receiving surface is a diffuser surface or screen such as a diffuser. The holographic projection system of the present disclosure may be used to provide an improved head-up display (HUD) or head-mounted display. In some embodiments, there is provided a vehicle comprising the holographic projection system installed in the vehicle to provide a HUD. The vehicle may be an automotive vehicle such as a car, truck, van, lorry, motorcycle, train, airplane, boat, or ship.

The quality of the holographic reconstruction may be affected by the so-called zero order problem which is a consequence of the diffractive nature of using a pixelated spatial light modulator. Such zero-order light can be regarded as "noise" and includes for example specularly reflected light, and other unwanted light from the SLM.

In the example of Fourier holography, this "noise" is focussed at the focal point of the Fourier lens leading to a bright spot at the centre of the holographic reconstruction. The zero-order light may be simply blocked out however this would mean replacing the bright spot with a dark spot. Some embodiments include an angularly selective filter to remove only the collimated rays of the zero order. Embodiments also include the method of managing the zero-order described in European patent 2,030,072, which is hereby incorporated in its entirety by reference.

In some embodiments, the size (number of pixels in each direction) of the hologram is equal to the size of the spatial light modulator so that the hologram fills the spatial light modulator. That is, the hologram uses all the pixels of the spatial light modulator. In other embodiments, the size of the hologram is less than the size of the spatial light modulator. In some of these other embodiments, part of the hologram (that is, a continuous subset of the pixels of the hologram) is repeated in the unused pixels. This technique may be referred to as "tiling" wherein the surface area of the spatial light modulator is divided up into a number of "tiles", each of which represents at least a subset of the hologram. Each tile is therefore of a smaller size than the spatial light modulator.

In some embodiments, the technique of "tiling" is implemented to increase image quality. Specifically, some embodiments implement the technique of tiling to minimise the size of the image pixels whilst maximising the amount of signal content going into the holographic reconstruction.

In some embodiments, the holographic pattern written to the spatial light modulator comprises at least one whole tile (that is, the complete hologram) and at least one fraction of a tile (that is, a continuous subset of pixels of the hologram).

The holographic reconstruction is created within the zeroth diffraction order of the overall window defined by the spatial light modulator. It is preferred that the first and subsequent orders are displaced far enough so as not to overlap with the image and so that they may be blocked using a spatial filter.

In embodiments, the holographic reconstruction is colour. In examples disclosed herein, three different colour light sources and three corresponding SLMs are used to provide composite colour. These examples may be referred to as spatially-separated colour, "SSC". In a variation encompassed by the present disclosure, the different holograms for each colour are displayed on different area of the same SLM and then combining to form the composite colour image. However, the skilled person will understand that at least some of the devices and methods of the present disclosure are equally applicable to other methods of providing composite colour holographic images.

One of these methods is known as Frame Sequential Colour, "FSC". In an example FSC system, three lasers are used (red, green and blue) and each laser is fired in succession at a single SLM to produce each frame of the video. The colours are cycled (red, green, blue, red, green, blue, etc.) at a fast enough rate such that a human viewer sees a polychromatic image from a combination of the images formed by three lasers. Each hologram is therefore colour specific. For example, in a video at 25 frames per second, the first frame would be produced by firing the red laser for $1/75$th of a second, then the green laser would be fired for $1/75$th of a second, and finally the blue laser would be fired for $1/75$th of a second. The next frame is then produced, starting with the red laser, and so on.

An advantage of FSC method is that the whole SLM is used for each colour. This means that the quality of the three colour images produced will not be compromised because all pixels of the SLM are used for each of the colour images. However, a disadvantage of the FSC method is that the overall image produced will not be as bright as a corresponding image produced by the SSC method by a factor of about 3, because each laser is only used for a third of the time. This drawback could potentially be addressed by overdriving the lasers, or by using more powerful lasers, but this would require more power to be used, would involve higher costs and would make the system less compact.

An advantage of the SSC method is that the image is brighter due to all three lasers being fired at the same time. However, if due to space limitations it is required to use only one SLM, the surface area of the SLM can be divided into three parts, acting in effect as three separate SLMs. The drawback of this is that the quality of each single-colour image is decreased, due to the decrease of SLM surface area available for each monochromatic image. The quality of the polychromatic image is therefore decreased accordingly. The decrease of SLM surface area available means that fewer pixels on the SLM can be used, thus reducing the quality of the image. The quality of the image is reduced because its resolution is reduced. Embodiments utilise the improved SSC technique disclosed in British patent 2,496,108 which is hereby incorporated in its entirety by reference.

Examples describe illuminating the SLM with visible light but the skilled person will understand that the light sources and SLM may equally be used to direct infrared or ultraviolet light, for example, as disclosed herein. For example, the skilled person will be aware of techniques for converting infrared and ultraviolet light into visible light for the purpose of providing the information to a user. For example, the present disclosure extends to using phosphors and/or quantum dot technology for this purpose.

Some embodiments describe 2D holographic reconstructions by way of example only. In other embodiments, the holographic reconstruction is a 3D holographic reconstruction. That is, in some embodiments, each computer-generated hologram forms a 3D holographic reconstruction.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. An image projector arranged to project an image onto a display plane, wherein the image projector comprises:
   a processing engine arranged to output a computer-generated diffractive pattern comprising a hologram of an image for projection and a lens function corresponding to a lens having a first optical power;
   a display device arranged to display the computer-generated diffractive pattern;

an optical element between the display device and the display plane, wherein the optical element has a second optical power;

a light source arranged to provide off-axis illumination of the display device in order to spatially-modulate light in accordance with the hologram and lens function, wherein the lens function of the computer-generated diffractive pattern and the optical element collectively perform a transform of the hologram such that a reconstruction of the image is formed on the display plane, wherein the optical element is substantially perpendicular to a propagation axis of spatially modulated light from the display device to the display plane, and wherein the display device is tilted with respect to the optical element by a first angle greater than zero and the display plane is tilted with respect to the optical element by a second angle greater than zero, wherein the second angle is less than the first angle, and wherein the display device and the display plane are tilted in the same direction with respect to the optical element.

2. An image projector as claimed in claim 1 wherein the angle of incidence of light from the light source on the display device is less than 30 degrees.

3. An image projector as claimed in claim 1 wherein the difference between the first angle and second angle is less that an angle of incidence of light from the light source on the display device.

4. An image projector as claimed in claim 1 wherein the difference between the first angle and the second angle is a function of the ratio of the first optical power to the second optical power.

5. An image projector as claimed in claim 4 wherein the difference between the first angle and the second angle is inversely proportional to the ratio of the first optical power to the second optical power.

6. An image projector as claimed in claim 1 wherein the processing engine is arranged to calculate the computer-generated diffractive pattern in real-time from an input.

7. An image projector as claimed in claim 6 wherein the input is a received image for reconstruction.

8. An image projector as claimed in claim 1 wherein the display plane comprises a light-receiving surface.

9. A head-up display comprising the image projector as claimed in claim 1.

10. A method of image projection, the method comprising:

providing a light modulation pattern defining a propagation distance to an image plane, wherein the light modulation pattern is (i) the combination of a Fourier hologram of an image and a lens function corresponding to a lens having a first optical power or (ii) a Fresnel hologram;

displaying the light modulation pattern on a display device;

illuminating the display device at an angle of incidence greater than zero; and receiving, via an optical element having a second optical power, spatially modulated light from the display device on a display plane, wherein the optical element is substantially perpendicular to a propagation axis of spatially modulated light from the display device to the display plane, and wherein the display device is tilted with respect to the optical element by a first angle greater than zero and the display plane is tilted with respect to the optical element by a second angle greater than zero, wherein the second angle is less than the first angle, and wherein the display device and the display plane are tilted in the same direction with respect to the optical element.

11. A method as claimed in claim 10 wherein the optical element is arranged between the display device and the display plane, wherein the light modulation pattern and the optical element collectively perform a transform of the hologram such that a reconstruction of the image is formed on the display plane.

12. A method as claimed in claim 10 wherein the angle of incidence of light from the light source on the display device is less than 30 degrees.

13. A method as claimed in claim 10 wherein the difference between the first angle and the second angle is inversely proportional to the ratio of the first optical power to the second optical power.

14. A method as claimed in claim 10 wherein the display plane comprises a light-receiving surface.

15. An image projector arranged to project an image onto a display plane, wherein the image projector comprises:

a processing engine arranged to output a computer-generated diffractive pattern comprising a hologram of an image for projection and a lens function corresponding to a lens having a first optical power;

a display device arranged to display the computer-generated diffractive pattern;

an optical element between the display device and the display plane, wherein the optical element has a second optical power;

a light source arranged to provide off-axis illumination of the display device in order to spatially-modulate light in accordance with the hologram and lens function, wherein the lens function of the computer-generated diffractive pattern and the optical element collectively perform a transform of the hologram such that a reconstruction of the image is formed on the display plane, wherein the optical element is substantially perpendicular to a propagation axis of spatially modulated light from the display device to the display plane, and wherein the display device is tilted with respect to the optical element by a first angle greater than zero and the display plane is tilted with respect to the optical element by a second angle greater than zero, and wherein the second angle is less than the first angle, wherein the difference between the first angle and second angle is less that an angle of incidence of light from the light source on the display device.

16. An image projector as claimed in claim 15 wherein the angle of incidence of light from the light source on the display device is less than 30 degrees.

17. An image projector as claimed in claim 15 wherein the difference between the first angle and the second angle is inversely proportional to the ratio of the first optical power to the second optical power.

18. An image projector as claimed in claim 15 wherein the display plane comprises a light-receiving surface.

19. A method of image projection, the method comprising:

providing a light modulation pattern defining a propagation distance to an image plane, wherein the light modulation pattern is (i) the combination of a Fourier hologram of an image and a lens function corresponding to a lens having a first optical power or (ii) a Fresnel hologram;

displaying the light modulation pattern on a display device;

illuminating the display device at an angle of incidence greater than zero; and receiving, via an optical element having a second optical power, spatially modulated light from the display device on a display plane, wherein the optical element is substantially perpendicular to a propagation axis of spatially modulated light from the display device to the display plane, and wherein the display device is tilted with respect to the optical element by a first angle greater than zero and the display plane is tilted with respect to the optical element by a second angle greater than zero, wherein the second angle is less than the first angle, and wherein the second angle is less than the first angle, wherein the difference between the first angle and second angle is less that an angle of incidence of light from the light source on the display device.

20. A method as claimed in claim 19 wherein the optical element is arranged between the display device and the display plane, wherein the light modulation pattern and the optical element collectively perform a transform of the hologram such that a reconstruction of the image is formed on the display plane.

21. A method as claimed in claim 19 wherein the angle of incidence of light from the light source on the display device is less than 30 degrees.

22. A method as claimed in claim 19 wherein the difference between the first angle and the second angle is inversely proportional to the ratio of the first optical power to the second optical power.

23. A method as claimed in claim 19 wherein the display plane comprises a light-receiving surface.

* * * * *